US012730793B2

(12) United States Patent
Shi et al.

(10) Patent No.: US 12,730,793 B2
(45) Date of Patent: Sep. 8, 2026

(54) HIERARCHICAL INTERFACES FOR SCREEN READER USERS

(71) Applicant: GDM Holding LLC, Mountain View, CA (US)

(72) Inventors: Lei Shi, Sunnyvale, CA (US); Tanya Kraljic, Ridgewood, NJ (US); Ashish Chaudhary, Waterloo (CA); Michael Cleron, Menlo Park, CA (US); Stephanie Guamán, Petaluma, CA (US); Xieyang Liu, Pittsburgh, PA (US); Shilp Vaishnav, San Francisco, CA (US); Nimer Jaber, Mountain View, CA (US); Shaun K. Kane, Broomfield, CO (US)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/913,924

(22) Filed: Oct. 11, 2024

(65) Prior Publication Data

US 2026/0010524 A1 Jan. 8, 2026

Related U.S. Application Data

(60) Provisional application No. 63/667,094, filed on Jul. 2, 2024.

(51) Int. Cl.
*G06F 16/22* (2019.01)

(52) U.S. Cl.
CPC ................................ *G06F 16/2246* (2019.01)

(58) Field of Classification Search
CPC ............... G06F 16/9027; G06F 16/322; G06F 16/2246; G06F 40/154; G06F 40/14
(Continued)

(56) References Cited

U.S. PATENT DOCUMENTS 6,388,668 B1 * 5/2002 Elliott ..................... G06T 13/00 345/619
8,633,900 B2 * 1/2014 Jin ........................ G06F 3/0482 345/173

(Continued)

FOREIGN PATENT DOCUMENTS

AU 2014101081 10/2014

OTHER PUBLICATIONS

European Patent Office, Communication issued in Application No. 25186026.8, 10 pages, dated Nov. 25, 2025.

(Continued)

*Primary Examiner* — Phong H Nguyen
(74) *Attorney, Agent, or Firm* — Gray Ice Higdon

(57) ABSTRACT

Implementations are described herein for hierarchical interfaces for screen reader users (SRUs). In various implementations, a first subtree of leaf nodes of a hierarchical data structure may be populated with content extracted or otherwise derived from digital content item(s), which may or may not be responsive to a search query. Generative model(s) may be used to process the content of the first subtree of leaf nodes to generate a first summary of the content used to populate the first subtree of leaf nodes. A first branch node above the subtree of leaf nodes may be populated with the first summary. The generative model(s) may be used to process first summary and a second summary to generate second tier output that includes a third summary of the first and second summaries. A screen reader interface may be provided and may be operable to facilitate navigation of the hierarchical data structure.

20 Claims, 7 Drawing Sheets

(58) Field of Classification Search
USPC .......................... 707/722, 741, 755, 769, 797
See application file for complete search history.

(56) References Cited

U.S. PATENT DOCUMENTS

| | | | | |
|---|---|---|---|---|
| 9,697,211 | B1 * | 7/2017 | Vermeersch | G06F 16/24556 |
| 2008/0086457 | A1 * | 4/2008 | Fei | G06F 16/951 |
| 2012/0054594 | A1 * | 3/2012 | Isaacson | G06F 16/44 715/230 |
| 2017/0076151 | A1 * | 3/2017 | Roy | G06F 40/289 |
| 2022/0318485 | A1 * | 10/2022 | Narayanan | G06F 40/205 |

OTHER PUBLICATIONS

Van Daele T., et al.; "Making Short-Form Videos Accessible with Hierarchical Video Summaries", pp. 1-17, XP059621215, DOI: 10.1145/3613904.3642839, dated May 11, 2024.

* cited by examiner

Figures 4A, 4B:
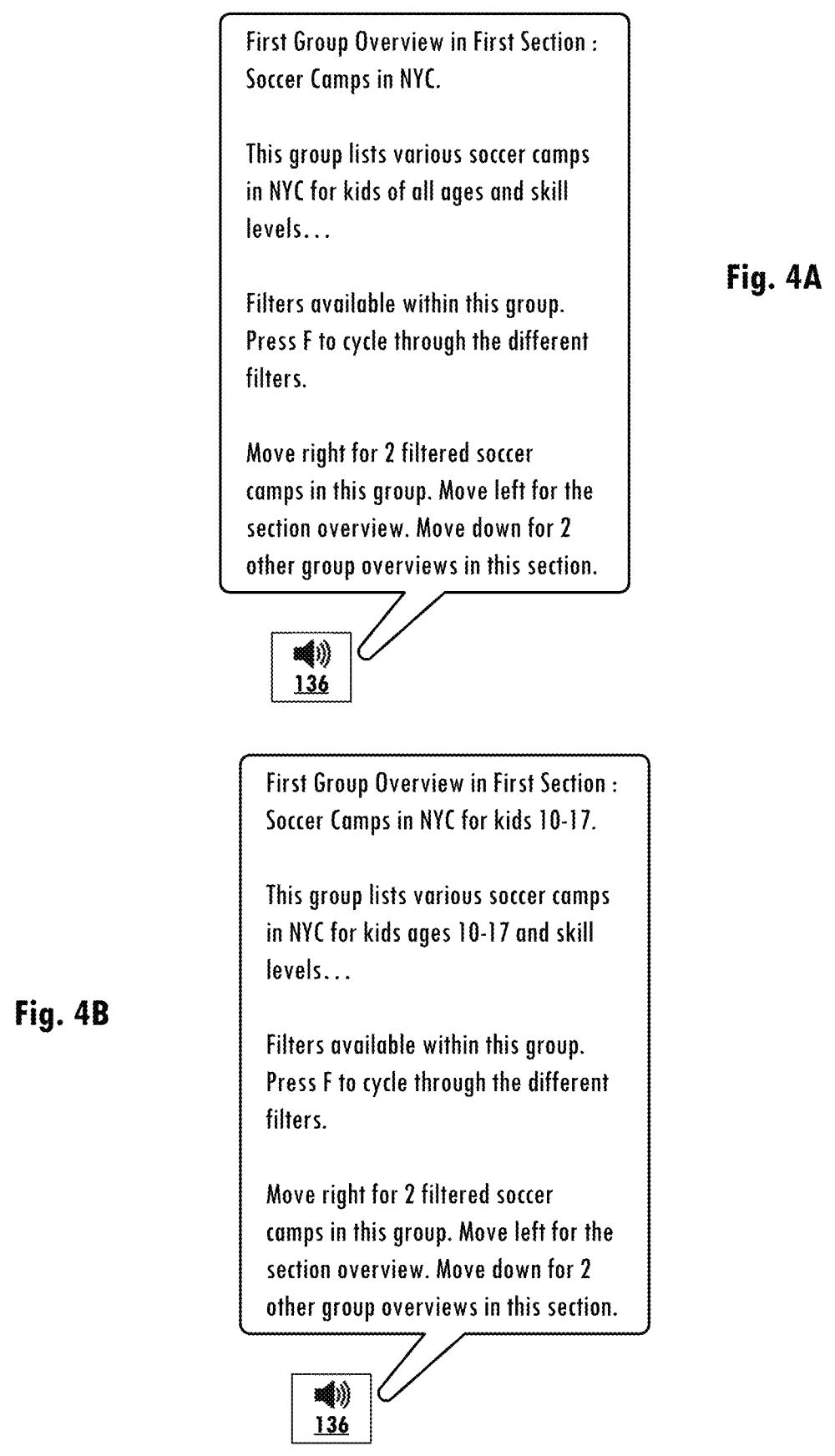

First Group Overview in First Section : Soccer Camps in NYC.

This group lists various soccer camps in NYC for kids of all ages and skill levels...

Filters available within this group. Press F to cycle through the different filters.

Move right for 2 filtered soccer camps in this group. Move left for the section overview. Move down for 2 other group overviews in this section.

First Group Overview in First Section : Soccer Camps in NYC for kids 10-17.

This group lists various soccer camps in NYC for kids ages 10-17 and skill levels...

Filters available within this group. Press F to cycle through the different filters.

Move right for 2 filtered soccer camps in this group. Move left for the section overview. Move down for 2 other group overviews in this section.

ACCESS HIERARCHICAL DATA STRUCTURE COMPRISING AT LEAST ONE BRANCH NODE AND A PLURALITY OF LEAF NODES THAT ARE DESCENDANTS OF THE AT LEAST ONE BRANCH NODE, EACH LEAF NODE CONTAINING RESPECTIVE CONTENT EXTRACTED OR OTHERWISE DERIVED FROM DIGITAL CONTENT ITEM(S) THAT ARE RESPONSIVE TO A SEARCH QUERY 602

BASED ON HIERARCHICAL DATA STRUCTURE, PROVIDE SRI THAT IS OPERABLE VIA INPUT RECEIVED AT INPUT DEVICE(S) TO NAVIGATE THE HIERARCHICAL DATA STRUCTURE AND RENDER OUTPUT AT SPEAKER(S) 604

RENDER, ON TOUCH SCREEN, HIGH-CONTRAST VISUALIZATION OF HIERARCHICAL DATA STRUCTURE THAT IS NAVIGABLE USING THE TOUCHSCREEN 606A

RENDER, ON TOUCH SCREEN OVERLAID WITH A TACTILE SEGMENTATION TEMPLATE THAT DEFINES WINDOWS, VISUALIZATION OF HIERARCHICAL DATA STRUCTURE WHEREBY LOGICAL SECTIONS OF HIERARCHICAL DATA STRUCTURE ARE RENDERED WITHIN SELECTED WINDOWS OF TEMPLATE 606B

RENDER INTERACTIVE VISUALIZATION OF HIERARCHICAL DATA STRUCTURE THAT INCLUDES BOUNDAR(IES) THAT SEPARATE LOGICAL SECTIONS OF HIERARCHICAL DATA STRUCTURE, WHEREIN INTERACTION WITH BOUNDAR(IES) TRIGGERS AUDIO OR HAPTIC FEEDBACK 606C

DETECT INPUTS THAT NAVIGATE THE SCREEN READER INTERFACE TO THE AT LEAST ONE BRANCH NODE OF THE HIERARCHICAL DATA STRUCTURE 608

IN RESPONSE TO THE DETECTED INPUTS, CAUSE A CROSS-NODE SUMMARY OF THE CONTENTS OF THE PLURALITY OF LEAF NODES TO BE RENDERED USING SPEAKER(S), WHEREIN THE CROSS-NODE SUMMARY IS GENERATED BY PROCESSING THE CONTENTS OF THE LEAF NODES USING GENERATIVE MODEL(S) 610

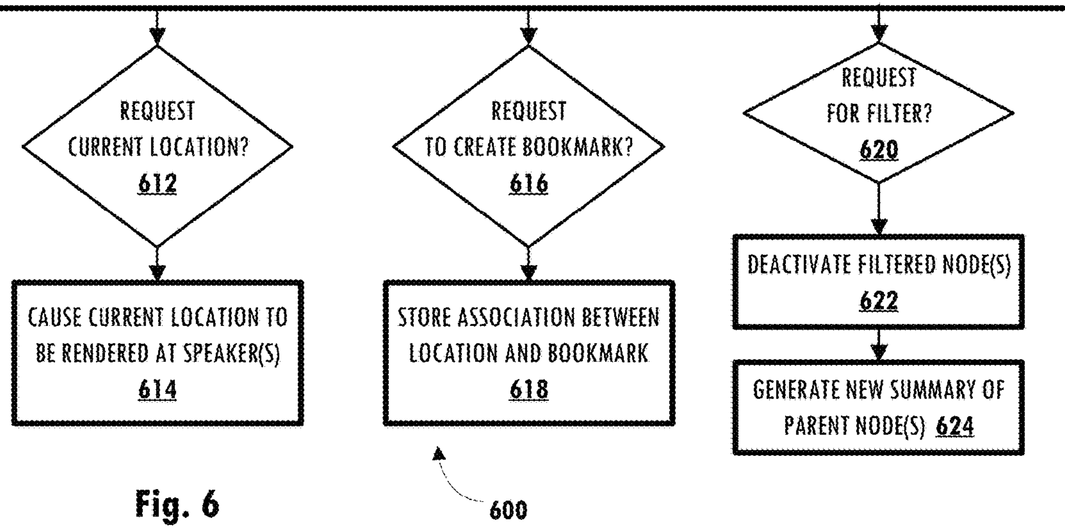

Fig. 6

HIERARCHICAL INTERFACES FOR SCREEN READER USERS

BACKGROUND

Screen reader users (SRUs) face significant challenges browsing websites due to inconsistent website designs, information overload, and lack of efficient navigation techniques. Variations in navigation structures and semantic markup across websites create confusion and force SRUs to relearn interaction patterns with each new site. This lack of standardization hinders SRUs' abilities to grasp the overall content organization. This challenge is particularly acute when an SRU is performing a complex search that requires filtering information and comparing options across many different websites.

Additionally, SRUs consume content linearly through auditory channels, lacking the visual overview and scanning capabilities available to sighted users. This often requires SRUs to listen to every element on a webpage in sequence, making it difficult and time-consuming to assess the relevance of content or locate specific sections of interest. This linear consumption, coupled with the inability to skim or preview information, can result in information overload.

Moreover, the inherent differences between visual and auditory information processing make navigation particularly challenging for SRUs. Elements that are visually grouped together may not be presented in a logical order auditorily. Moreover, content designed to be quickly skimmed or skipped by sighted users, such as advertisements or decorative images, can create unnecessary obstacles for SRUs, who must navigate through them sequentially. To cope with these challenges, SRUs often develop personalized browsing strategies, but these strategies may not always be effective across different websites.

SUMMARY

Implementations described here relate to hierarchical interfaces for screen reader users (SRUs), e.g., users with a visual impairment. More particularly, but not exclusively, techniques are described herein for organizing content of digital content item(s) that are responsive to a search query into leaf nodes of a hierarchical data structure, and populating higher level nodes of the hierarchical data structure with increasingly generalized and/or broad, cascading summarizations of the leaf nodes' and/or intermediate branch nodes' contents.

BRIEF DESCRIPTION OF THE DRAWINGS

FIG. 4A and FIG. 4B schematically depict examples of how different outputs may be rendered before and after filtering, respectively.

FIG. 6 depicts an example method for practicing selected aspects of the present disclosure.

DETAILED DESCRIPTION

Figure 1:
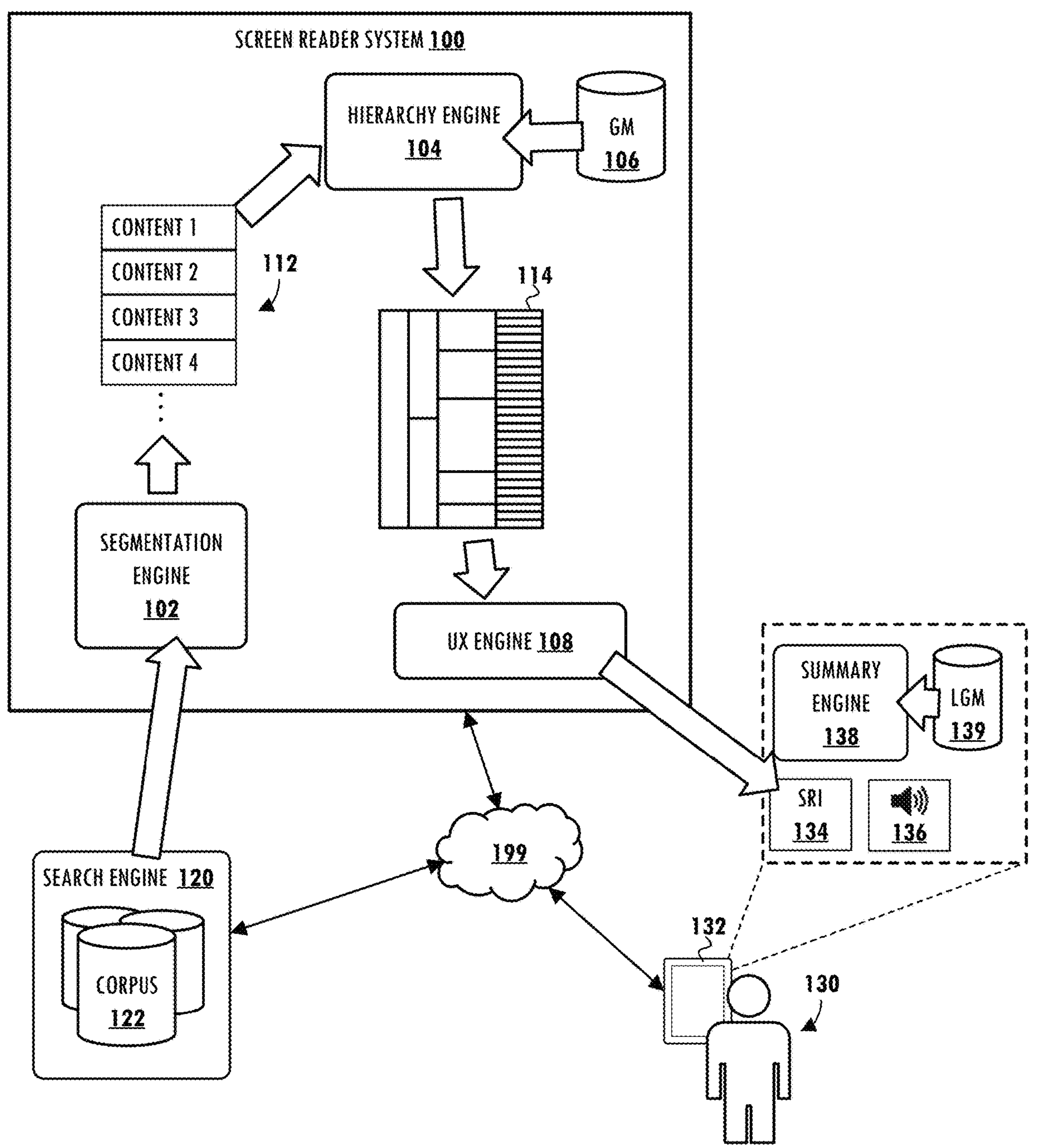
FIG. 1 schematically depicts an example environment in which disclosed techniques may be employed, in accordance with various implementations.

Implementations described here relate to hierarchical interfaces for screen reader users (SRUs). More particularly, but not exclusively, techniques are described herein for organizing content of digital content item(s) that are responsive to a search query into leaf nodes of a hierarchical data structure, and populating higher level nodes of the hierarchical data structure with increasingly generalized and/or broad, cascading summarizations of the leaf nodes' and/or intermediate branch nodes' contents. Implementations described herein can facilitate a SRU to interactively search and retrieve stored digital content (e.g., images, videos, audio, text, etc.) more efficiently by allowing overviews of several digital content items and/or several elements of digital content item to be presented to the SRU in an efficient manner.

In various implementations, a search query issued by a SRU may be used, e.g., by a general purpose search engine or other search engine, to retrieve responsive document(s) (or more generally, responsive digital content items). These responsive digital content items may come in various forms, such as textual documents (e.g., books or other composed content), web pages, portable document format (PDF) documents, images, videos, audio files, etc. The responsive digital content items may be segmented into chunks of data, e.g., based on detected topics, individual documents, textual organization (e.g., by paragraph or chapter), semantic similarity, etc.

In various implementations, these segmented chunks of data may be used to populate leaf nodes of a hierarchical data structure. As a working example, suppose a SRU issues the query, "how do I rebuild a car engine" to a general purpose search engine Some number of results (e.g., web pages, instructional videos) may be returned corresponding to different techniques for rebuilding various parts of various types of vehicle engines. These results may be processed to generate content for the leaf nodes, e.g., with each leaf node being populated with content for a different aspect of rebuilding an engine.

In some cases, each leaf node may correspond to (e.g., be populated with content extracted or otherwise derived from) a different responsive digital content item. For example, content of a first web page describing rebuilding one type of engine may be segmented into one leaf node, content of a digital video demonstrating rebuilding another type of engine may be segmented into another leaf node, and so on. Additionally or alternatively, multiple leaf nodes may be populated with content from different portions of the same digital content, e.g., portions dealing with different topics. For example, suppose one digital video presents multiple different instructional sections (e.g., chapters, different subheadings, segments) for different aspects of rebuilding engines generally, e.g., one for engine removal, another for engine disassembly, another for cleaning, another for inspection, another for machine work, another for reassembly, and so on. Content corresponding to (e.g., extracted directly or otherwise derived from) each aspect may be segmented into its own respective leaf node.

In various implementations, the number of leaf nodes that are created may be determined based on various factors. These factors may include, for instance, a predetermined threshold (e.g., no more than ten leaf nodes), the number of responsive digital content items (e.g., only content from the first 10% of results should be returned if there are greater than x responsive documents, but content from the first 20% of results should be returned if there are less than x responsive documents and greater than y responsive documents, and so on), an amount of duplicative content detected across the responsive digital content items, the number of semantically distinct topics discussed in the responsive digital content items, and so forth.

Once the leaf nodes are populated with content segmented from the responsive digital content item(s), one or more summaries of the leaf nodes' contents may be generated and used to populate one or more branch nodes that are parents of the leaf nodes. In some implementations, these summaries may be generated using one or more generative models. Generative model(s) described herein may take various forms, including, but not limited to, model(s) such as Gemini, Flamingo, PaLM, BERT, LaMDA, Meena, and/or any other generative model, such as any other generative model that is encoder-decoder based, encoder-only based, decoder-only based, sequence-to-sequence based and that optionally includes an attention mechanism or other memory, diffusion model(s), etc. Generative models may have hundreds of millions, or even hundreds of billions of parameters. In some implementations, generative models may include large language models (LLMs) and/or multi-modal models such as a vision language model (VLM) and/or a visual question answering (VQA) model, which can have any of the aforementioned architectures, and which can be used to process multiple modalities of data, particularly images and text, and/or images and audio for example, to generate one or more modalities of output.

The number of summaries, and hence, parent branch nodes, that are generated from the leaf nodes' contents may depend on various factors. In some cases, an indication of how many summaries/branch nodes should be created may be specified in a request that is included in a generative model prompt, along with the leaf nodes' contents. This indication may be expressed in various forms, such as a precise number, a range, one or more conditional ranges, a mathematical expression, etc. For example, such a request may specify a target ratio of leaf nodes to parent branch nodes such as 2:1, 4:1. 6:1, 8:1, 10:1, or any other ratio.

Additionally or alternatively, the number of summaries/parent branch nodes that are generated may be based on aspect(s) of the lead nodes themselves and/or their contents. These aspects may include, but are not limited to, length(s) of the respective leaf nodes' contents, measure(s) of complexity (e.g., determined using a machine learning model trained for such a purpose), semantic topics contained across the leaf nodes' contents, number of leaf nodes, etc.

In some implementations, the leaf nodes' contents may be grouped into semantically similar clusters, e.g., using the generative model(s) discussed previously and/or using different techniques (e.g., k-means, cosine similarity) and/or machine learning models. These clusters may be used to determine the number of summaries/parent branch nodes. Referring once again to the working engine rebuilding example, suppose the leaf nodes are populated with relatively granular content, such as: a first set of leaf nodes where each describes how to remove a different model of engine; a second set of leaf nodes where each describes how to disassemble a different model of engine; a third set of leaf nodes where each describes each describing how to clean a different model of engine, and so forth.

In various implementations, the leaf nodes' contents may be grouped into semantically similar clusters, e.g., one cluster of leaf nodes describing engine removal generally, one cluster of leaf nodes describing engine disassembly generally, one cluster of leaf nodes describing engine cleaning generally, and so forth. Then, the contents of each cluster's leaf nodes may be processed, e.g., using one or more of the aforementioned generative models, to generate a summary for the cluster. As used herein, a "summary" may be unimodal, such as a purely textual summary, or multimodal, such as a summary that includes text, images, video, and/or audio. This summary can then be used to populate the branch node that is parent to the leaf nodes of that cluster.

In various implementations, similar techniques may be used to generate higher level (e.g., less granular, more general) summaries of content of one or more additional tiers of branch nodes. These higher level summaries may be used to populate one or more additional tiers of branch nodes of the hierarchical data structure above the initial tier of branch nodes above the leaf nodes. This process may be performed iteratively all the way until a single "home" or "root" node is generated. In some implementations, this root node may include a summary of all the content that was used to populate all of the lower nodes of the hierarchical data structure. In some such implementations, the root node summary may be relatively succinct, e.g., a paragraph, one to two sentences, or even less (e.g., a pithy title), although this is not required.

In some implementations, each branch or root node may include, as part of or in addition to the summary of lower nodes' contents, other information, such as a location identifier (e.g., a unique identifier, a path down from the root node or up from one or more leaf nodes, etc.), selectable indication(s) of parent nodes and children nodes (which may aid in navigation), tags (e.g., topics detected by generative model(s) in the content of the nodes), bookmarks, and so forth. For example, a given branch node may include, in addition to (or as part of) a textual summary of contents populating its children nodes, selectable indications (e.g., hyperlinks, deep links, textual snippets that can be read aloud to be actuated) of neighbor nodes (connected by edges) that can be traversed to, e.g., by a SRU operating a screen reader interface.

In various implementations, a representation of the hierarchical data structure (which may be a tree, for instance) may be provided in various forms, such as in a markup or other structured language such as the extensible markup language (XML), DAG of tomorrow (DOT), JavaScript Object Notation (JSON), hypertext markup language (HTML), graph modeling language (GML), JavaScript, and so forth. This representation may, in some cases, be provided (e.g., transmitted over one or more networks) to a client device operated by a SRU that issued the initial search query. The client device, e.g., by way of a screen reader application or plugin (e.g., for a web browser), may implement a screen reader interface based on the representation (including implementing any JavaScript contained therein), much in the way HTML/JavaScript is used by a web browser to render an interactive web page. The SRU may then navigate between nodes of the hierarchical data structure, e.g., using arrow keys, voice commands, gestures, touch-screen inputs, etc., to cause the nodes' contents (e.g., summaries, data extracted or otherwise derived from responsive documents) to be rendered aloud at one or more speakers operably coupled with the client device.

In some implementations, the SRU may be able to create bookmarks for nodes. These bookmarks may include associations between metadata of the bookmark (e.g., a title, user-created nickname, etc.) and a location of the node at which the SRU requested the bookmark. The SRU may subsequently navigate directly to such a bookmark, e.g., by speaking a title or other identifier of the bookmark, operating a particular keyboard shortcut that is assigned to the bookmark, etc.

In various implementations, the SRU may be able to filter out some nodes to reduce information overload, e.g., using JavaScript functionality of the representation of the hierarchical data structure. For example, each node (leaf or branch or root) may be assigned one or more tags. These tags may correspond to topics described in the content of these nodes, for instance. In some implementations, the tags may be derived by the same generative model(s) that were used to generate the various summaries described previously. If a particular branch node has multiple child nodes (leaf or branch), the SRU can request that particular tags be included and/or excluded. In response, only those children nodes that contain one or more terms selected by the SRU may be considered "active." In response, the filtered out nodes may not be navigable, at least until those filters have been revoked. Additionally or alternatively, in some implementations, filtering out some child nodes may trigger generation of a new summary of contents of the remaining child nodes, e.g., so that the summary does not include content the SRU intended to filter out. This new summary may, in some implementations, be stored in the same node at which the SRU requested filtering, e.g., as an addendum to the prior summary that summarized all the child nodes, or as a replacement.

Several implementations described herein relate to methods for performing selected aspects of the present disclosure. Other implementations may include a non-transitory computer readable storage medium storing instructions executable by a processor to perform a method such as one or more of the methods described herein. Yet another implementation may include a control system including memory and one or more processors operable to execute instructions, stored in the memory, to implement one or more modules or engines that, alone or collectively, perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

FIG. 1 is a schematic diagram illustrating components that can cooperate to carry out selected aspects of the present disclosure, in accordance with various implementations. The various components depicted in FIG. 1, particularly those components forming a screen reader system 100, may be implemented using any combination of hardware and software. The components of FIG. 1 are depicted as being communicatively coupled with each other via one or more networks 199, which may include one or more personal area networks, local area networks, and/or wide area networks (e.g., the Internet). However, this is not meant to be limiting. Various aspects of the present disclosure that are described as being performed by and/or stored on system 100 can alternatively be performed by and/or stored elsewhere and/or distributed across multiple systems, such as between system 100 and a client device 132.

In some implementations, screen reader system 100 may include one or more computing devices cooperating to perform selected aspects of the present disclosure. An example of such a computing device is depicted schematically in FIG. 7. In some implementations, screen reader system 100 may include one or more servers forming part of what is often referred to as a "cloud" infrastructure, or simply "the cloud." Alternatively, one or more components of system 100 may be operated by client device 132, or system 100 may be operated partially by client device 132 and partially on the cloud.

Similarly, a search engine 120 may include one or more servers forming part of the cloud. In various implementations, search engine 120 may be a general purpose search engine that is available to the public, and which has access to one or more corpuses 122 of public digital content items. In some implementations, search engine 120 may be a private search engine that has access to corpus(es) of digital content items that are private to a particular enterprise, such as a company, non-profit, governmental agency, etc. As used herein, a "digital content item" refers to any piece of digital content that can be consumed using a computing device equipped with suitable output devices. Digital content items may include, but are not limited to, documents in various formats (e.g., word processing documents, textual documents, web pages, presentations, spreadsheets, portable document format (PDF) documents, etc.), images, videos, audio files, databases, and so forth.

In various implementations, a user 130 may interact with screen reader system 100 using a client device 132. While depicted as a tablet computer or smartphone in FIG. 1, client device 132 may take other forms, such as a desktop or laptop computer, in-vehicle computing device, augmented reality (AR) and/or virtual reality (VR) headset or glasses, standalone "smart" speakers that host voice-driven interactive automated assistants, etc.

While shown as separate systems that communicate using network(s) 199, this is not meant to be limiting. Aspects described herein as being performed by screen reader system 100 may be implemented in whole or in part on client device 132. For example, in FIG. 1, client device 132 includes a screen reader interface (SRI) 134 and a local summary engine 138 that is configured to use one or more local generative models (LGM) 139 to generate summaries of various data, such as summaries of contents of nodes of a hierarchical data structure.

Screen reader system 100 may include a segmentation engine 102, a hierarchy engine 104, one or more generative models 106, and a UX engine 108. Any of elements 102, 104, and 108 may be implemented using any combination of hardware and software. Moreover, any of elements 102, 104, and/or 108 may be combined with other(s) of elements 102, 104, and/or 108.

In various implementations, user 130 may operate client device 132 to issue a search query to search engine 120. Search engine 120 may retrieve, from corpus(es) 122, digital content items that are responsive to the search query. As shown by the arrow in FIG. 1, these responsive digital content items may be provided (over one or more networks 199) to screen reader system 100, in particular to segmentation engine 102.

Segmentation engine 102 may be configured to segment the responsive digital content items into chunks of data, e.g., based on detected topics, individual documents, textual organization (e.g., by paragraph or chapter), semantic similarity, etc. Segmentation engine 102 may then populate leaf nodes 112 of a hierarchical data structure 114 with these segmented chunks of data. In FIG. 1, the chunks of data that have been used to populate the leaf nodes 112 are referred to as "CONTENT 1," "CONTENT 2," "CONTENT 3," "CONTENT 4," . . . . In FIG. 1, the leaf nodes 112 are also depicted as the right-most portion of the larger hierarchical data structure 114. This will be demonstrated in greater detail in FIG. 2.

Hierarchy engine 104 may be configured to populate the remainder of the hierarchical data structure 114, including branch nodes at one or more tiers above the leaf nodes and in some cases, a root node at top, with information (e.g., natural language) that summarizes content of lower nodes. In some implementations, each intermediate or branch node may be populated with content that summarizes content of nodes immediately beneath it. Thus, for instance, contents of leaf nodes may be summarized and used to populate first tier nodes that are the immediate parents of the leaf nodes. One or more second tier nodes above the first tier nodes may be populated with summaries of contents of the first tier nodes. And so on. Hierarchical data structure 114 may take various forms, such as a tree, graph, etc.

For instance, in various implementations, hierarchy engine 104 may use one or more generative models 106 to process data indicative of content used (e.g., by segmentation engine 102) to populate a subtree of leaf nodes, to generate what will be referred to herein as a "first tier" output. The first tier output may include, for instance, a first summary of content used to populate the subtree of leaf nodes. Then, hierarchy engine 104 may populate a first branch node of the first tier of the hierarchical data structure above the subtree of leaf nodes (i.e. the "parent" of the leaf nodes of the subtree) with the generated summary of the content used to populate the subtree of leaf nodes. Hierarchy engine 104 may use generative model(s) 106 to generate similar summaries of other subtrees of leaf nodes in a similar fashion.

This process may be repeated until the hierarchical data structure 114 is formulated having some number of tiers. The number of tiers may be fixed or dynamic. In the latter case, the number of tiers may be dictated by a wide variety of factors, such as attribute(s) of the digital content items that were responsive to the search query issued by user 130 (e.g., complexity, length, data type, variation, number of disparate topics, etc.), user parameters and/or preferences, and so forth. For example, in various implementations, hierarchy engine 104 may use generative model(s) to process data indicative of multiple different summaries used to populate multiple different branch nodes, with each branch node having some number of children (e.g., leaf or lower branch) nodes. A "summary of summaries" may describe content used to populate multiple different branch nodes, each branch node having its own subtree of leaf or branch nodes in the hierarchical data structure. Such summaries and "summaries of summaries" can be particularly beneficial for image-based digital content items, which otherwise may be difficult for a SRU to interact with and/or navigate.

In various implementations, data representing hierarchical data structure 114 may take the form of a structured text document, such as markup language document, that represents the hierarchical data structure. Various formats of structured text may be used, such as HTML, XML, JSON, GML, DOT, and so forth. In some implementations, hierarchy engine 104 and/or UX engine 108 may assemble the structured text document. UX engine 108 may then transmit, e.g., network(s) 199, the structured text document to a computing device, such as client device 132, that implements SRI 134. In various implementations, the structured text document may include client-side scripting, such as JavaScript, that SRI 134 leverages to provide an interactive screen reader experience for user 130.

In some implementations, in addition to navigating hierarchical data structure 114, user 130 may be able to operate SRI 134 to perform additional actions. These additional actions may include, for instance, creating bookmarks/shortcuts at particular locations within hierarchical data structure 114, applying filters that are usable to exclude certain content/topics, requesting location(s) within hierarchical data structure 114 and/or provide data about neighboring nodes (to aid in navigation), and so forth.

To avoid introducing significant latency and/or requiring additional back-and-forth between client device 132 and screen reader system 100, in some implementations, client device 132 may be equipped with its own local generative model(s) (LGM) 139 that are trained to facilitate local performance of selected aspects of the present disclosure. In FIG. 1, for example, client device 132 includes a summary engine 138 (can be implemented using any combination of hardware or software) that is configured to use LGM 139 to generate summaries locally. Summary engine 138 may be configured to use LGM 139 to generate updated summaries when, for instance, user 130 applies one or more filters. Suppose that while user 130 operates SRI 134 to navigate hierarchical data structure 114, user 130 applies a filter to exclude content related to "cats." In various implementations, SRI 134 may cause one or more nodes that relate partially or wholly to cats, such as one or more branch and/or leaf nodes, to become deactivated, e.g., so that user 130 cannot navigate to them. In addition, summary engine 138 may use LGM 139 to process content of the remaining, unfiltered nodes, e.g., nodes of the subtree that were unrelated to cats, to generate a new summary that describes content of the subtree other than content relating to cats.

While many implementations described herein relate to a purely audible screen reader experience for user 130, this is not meant to be limiting. In various implementations, techniques described herein may be used to render visual interfaces as well. For example, in some implementations, the structured text document representing hierarchical data structure 114 may be operable, e.g., by SRI 134, to render a high-contrast visualization of hierarchical data structure 114 that is navigable using, for instance, a touchscreen. Such a high-contrast rendition may be usable by users having at least partial vision.

Figure 3:
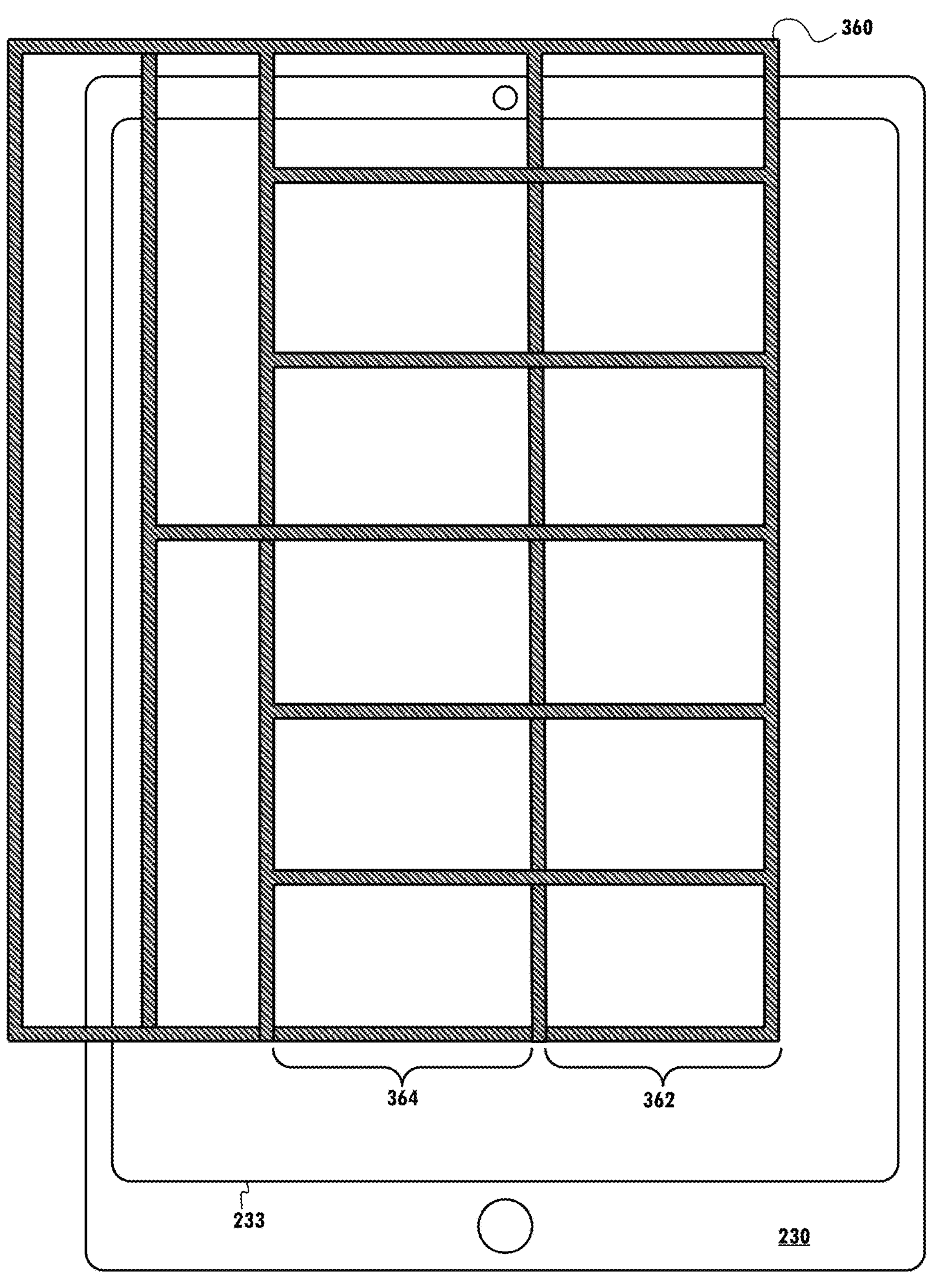
FIG. 3 depicts an example of a tactile segmentation template.

Additionally or alternatively, in some implementations, the structured text document representing hierarchical data structure 114 may be operable, e.g., by SRI 134, to render, e.g., on a touchscreen overlaid with a tactile segmentation template that defines a plurality of windows over the touchscreen, a visualization of the hierarchical data structure in which logical sections of the hierarchical data structure are rendered within selected windows defined by the tactile segmentation template. An example of such a tactile segmentation template is shown in FIG. 3.

Additionally or alternatively, in some implementations, the structured text document representing hierarchical data structure 114 may be operable, e.g., by SRI 134, to render, on a display, an interactive visualization of hierarchical data structure 114 that includes one or more boundaries that separate logical sections of the hierarchical data structure. In various implementations, interaction with one or more of the boundaries may trigger rendition of audio or haptic feedback. For example, as user 130 drags a finger (or a stylus) across a touchscreen on which such boundaries have been rendered, devices such as small motor(s) within client device 132 may provide haptic feedback, e.g., in the form of vibrations having magnitudes, amplitudes, and/or frequencies that are proportionate with the relative proximity of the user's finger to a rendered boundary. For instance, as the user's finger approaches a boundary, the vibration may increase in intensity or frequency until peaking while the user's finger actually touches the boundary. As the user's finger then moves past and away from the boundary, the intensity or frequency of the vibration may decrease. Similar feedback may be provided audibly, e.g., with the pitch and/or volume increasing the closer the user's finger (or stylus) is to a rendered boundary.

Figure 2:
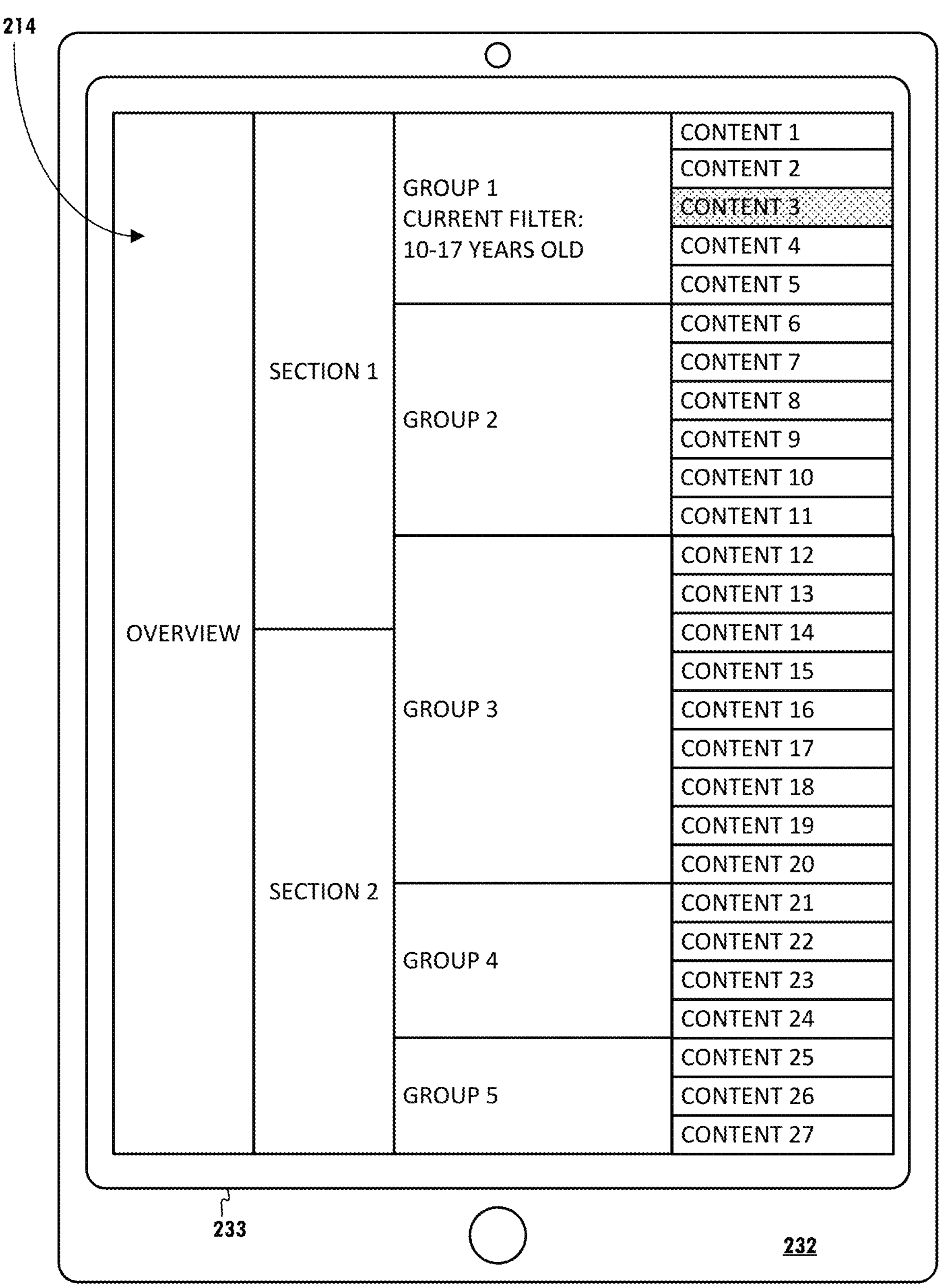
FIG. 2 schematically depicts an example computing device configured with selected aspects of the present disclosure.

FIG. 2 schematically depicts an example client device 232 configured with selected aspects of the present disclosure. In FIG. 2, client device 232 takes the form of a tablet computer or smart phone having a touchscreen 233, but this is not meant to be limiting. In FIG. 2, a hierarchical data structure 214 has been rendered on touchscreen 233. At the far right of hierarchical data structure 214, a plurality of individual leaf nodes "CONTENT 1, CONTENT 2, . . . CONTENT 27" are shown that correspond to different segments of content extracted or otherwise derived from digital content item(s) that are responsive to a search issued by user 130. For example, each leaf node may correspond to a separate digital content item (e.g., document, image) that was responsive to the user's search, or to a different logical and/or semantic portion (e.g., sentence, paragraph, chapter, etc.) of a responsive digital content item.

Above the leaf nodes and forming a first tier of branch nodes are a plurality of groups, "GROUP 1, GROUP 2 . . . GROUP 5." While five groups (and hence, first tier branch nodes) are depicted in FIG. 2, this is not meant to be limiting. The number of branch nodes that are formed above the leaf nodes may depend on any number of factors, such as a specific request from user 130, breadth of the user's search query (e.g., a broader search may result in a wider variety of responsive digital content items), complexity of the responsive digital content items, and so forth. Each branch node of the first tier may be populated with a summary (textual or multimodal) of its children leaf nodes. For example, the branch node GROUP 1 may include a summary of the subtree of leaf nodes that includes CONTENT 1 through CONTENT 5. The branch node GROUP 2 may include a summary of the subtree of leaf nodes that includes CONTENT 6 through CONTENT 11. The branch node GROUP 3 may include a summary of the subtree of leaf nodes that includes CONTENT 12 through CONTENT 20. And so forth. Similar tiers are rendered above the second tier (e.g., a third tier with SECTION 1 and SECTION 2) until a home or root node (OVERVIEW) is rendered.

User 130 may be able to operate client device 232, and particularly an SRI (not depicted) operated by client device 232, to navigate hierarchical data structure 214. In FIG. 2, this may be accomplished by user 130 issuing voice commands and/or by operating touchscreen 233. Navigating to a particular node may cause that node's contents, such as the summary of nodes of the corresponding subtree of nodes, to be rendered audibly and/or visually (e.g., in high contrast, large font, etc.). For example, navigating to the leaf node CONTENT 9 may cause content that was segmented by segmentation engine 102 to that node to be rendered. In some implementations, segmentation engine 102 may leverage generative model(s) 106 to generate a summary of content that it uses to populate leaf nodes, rather than including the raw content extracted from the responsive digital content items.

In FIG. 2, user 130 has set a filter in the branch node GROUP 1. Assume for this example that user 130 is searching for information about summer camps for children. The filter applied by user 130 may exclude content about kids under ten years old (e.g., because user 130 has no kids younger than ten years old), such that only content about kids aged 10-17 is presented. Consequently, and as indicated by the shading, user 130 may not be able to navigate to the leaf node "CONTENT 3" because, for instance, that leaf node's contents relates to summer camp programs for kids under ten. In addition, in some cases, local summary engine 138 may use LGM 139 to generate a new summary that is used to populate the branch node "GROUP 1." This new summary may only summarize contents of the first, second, fourth, and fifth leaf nodes, and may exclude content from the leaf node "CONTENT 3."

FIG. 3 depicts an example of a tactile segmentation template 360 that can be overlaid on top of touchscreen 233 to provide a tactile interface that user 130 can use to navigate hierarchical data structure 214 if/when it is rendered on touchscreen 233. Tactile segmentation template 360 may be constructed with various different materials, such as rubber, polymer(s), silicone, etc., and may have a raised profile that is detectable via touch. Tactile segmentation template 360 may be secured to touchscreen 233 in various ways, such as using temporary or permanent adhesive, suction, etc. In some implementations, tactile segmentation template 360 may be constructed at least partially with a tackifier, which itself may be formulated using various types of resin, rosins, terpenes, aliphatic compounds, etc., so that tactile segmentation template 360 tends to stick to touchscreen 233.

In various implementations, tactile segmentation template 360 defines a plurality of windows that, when tactile segmentation template 360 is affixed to touchscreen 233, overlay different regions of touchscreen 233. In various implementations, a visualization of hierarchical data structure 214 may be rendered in which logical sections of hierarchical data structure 214 are rendered within selected windows defined by tactile segmentation template 360. For example, rightmost windows 362 may overlay portions of touchscreen 233 that each overlay some number of leaf nodes. Windows 364 may overlap portions of touchscreen 233 that each overlays a single branch node of the first tier of hierarchical data structure 24 above the leaf nodes. And so on.

FIG. 4A depicts example output that may be rendered using speaker 136 in response to user 130 navigating SRI 134 to a particular branch node of hierarchical data structure 114/214. In this example, the output includes a summary of content of underlying node(s), "Soccer Camps in NYC. This group lists various soccer camps in NYC for kids of all ages and skill levels" The output also includes an indication that available filters for this group can be accessed by pressing the "F" key. The output also includes navigation information about neighboring nodes, "Move right for 2 filtered soccer camps in this group. Move left for the second overview. Move down for 2 other group overviews in this section." FIG. 4B depicts how the output might change if user 130 applies the filter depicted in FIG. 2 to exclude camps for kids under ten years old.

Figure 5:
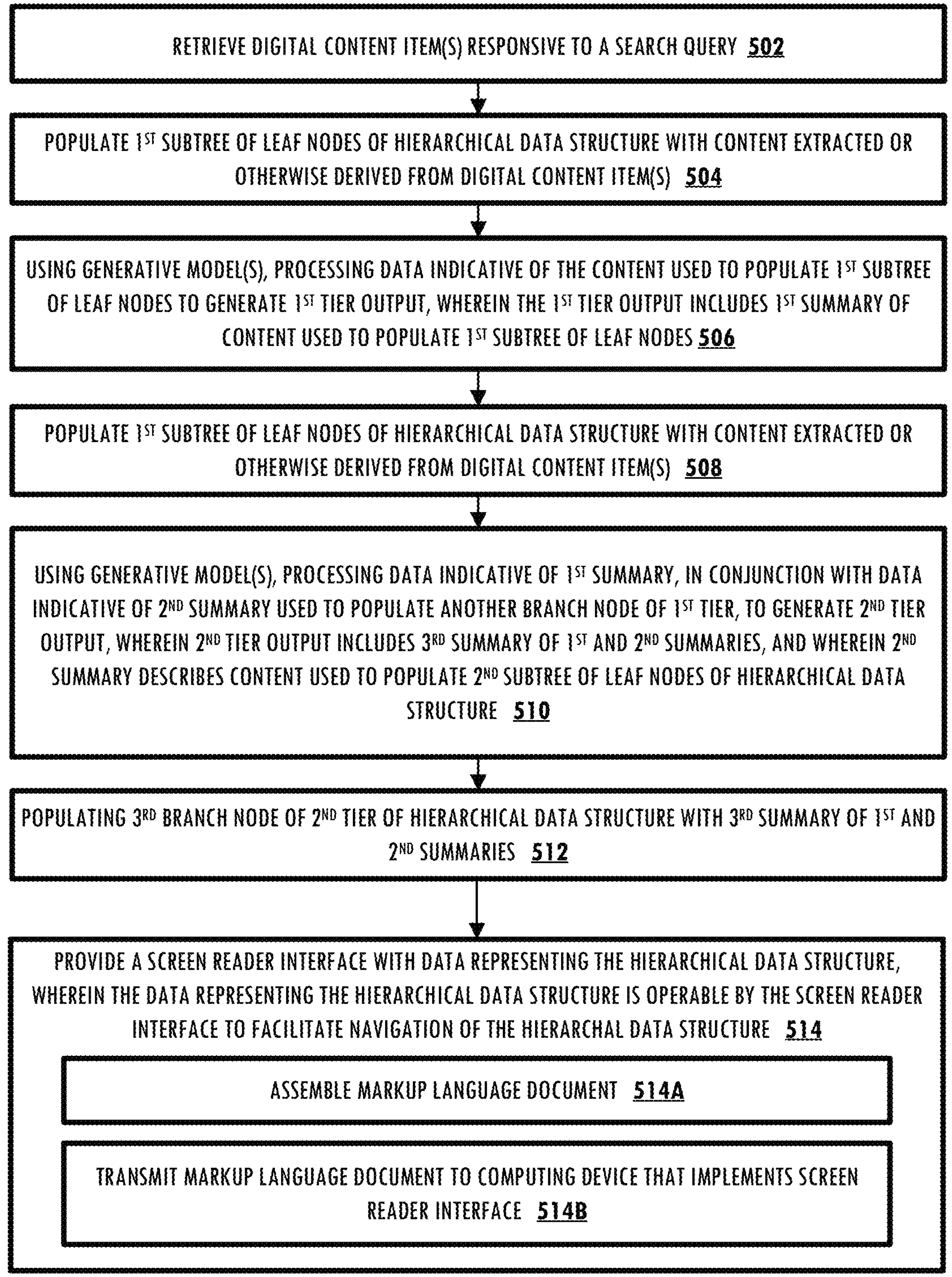
FIG. 5 depicts an example method for practicing selected aspects of the present disclosure.

Referring now to FIG. 5, an example method 500 of practicing selected aspects of the present disclosure is described. For convenience, the operations of the flowchart are described with reference to a system that performs the operations. This system may include various components of various computer systems, including those depicted in FIG. 1. Moreover, while operations of method 500 are shown in a particular order, this is not meant to be limiting. One or more operations may be reordered, omitted or added.

At block 502, the system, e.g., by way of segmentation engine 102, may retrieve one or more digital content items that are responsive to a search query. For example, when user 130 issues a search query, responsive documents and other digital content items that are returned on a search results page may be retrieved, e.g., by segmentation engine 102. These digital content items may be unimodal and/or multimodal.

At block 504, the system, e.g., by way of segmentation engine 102, may populate a first subtree of leaf nodes of a hierarchical data structure (e.g., 114, 214) with content extracted or otherwise derived from one or more of the digital content items. For example, segmentation engine 102 may extract content from responsive digital content item(s) and populate leaf node(s) with that extracted content verbatim. Additionally or alternatively, segmentation engine 102 (or hierarchy engine 104) may use generative model(s) 106 to generate summaries of extracted content. For example, if each leaf node corresponds to a single digital content item, segmentation engine 102 or hierarchy engine 104 may prompt generative model(s) 106 with (i) a request to generate a summary, and (ii) contents of a respective digital content item to summarize.

In some implementations in which the responsive digital content items include non-textual contents, segmentation engine 102 and/or hierarchy engine 104 may generate textual summaries of the non-textual contents. For example, if the responsive digital content items are images or videos, segmentation engine 102 and/or hierarchy engine 104 may process these images or videos (alone or in combination with metadata such as timestamps, geolocation) using a multimodal generative model 106 (e.g., a VLM or similar) to generate a textual summary, e.g., a caption. Additionally or alternatively, in some implementations in which digital content items include textual content, such as a scene description, segmentation engine 102 and/or hierarchy engine 104 may process these images or videos using a multimodal generative model 106 (e.g., a diffusion model) to generate image(s) and/or video(s) based on the scene description.

Referring back to FIG. 5, at block 506, and using one or more generative models 106, hierarchy engine 104 may process data indicative of the content used to populate the first subtree of leaf nodes to generate first tier output. This first tier output may include a first summary of the content used to populate the first subtree of leaf nodes. As an example, if each leaf node is populated with content about a separate summer camp or summer camp program, the first summary may briefly describe and/or give an overview of all the different summer camps and/or programs. In various implementations, at block 508, the system, e.g., by way of hierarchy engine 104 or segmentation engine 102, may populate a first branch node of a first tier of the hierarchical data structure above the subtree of leaf nodes with the first summary of the content used to populate the first subtree of leaf nodes.

At block 510, and using generative model(s) 106, the system, e.g., by way of hierarchy engine 104, may process data indicative of the first summary generated at block 506, in conjunction with data indicative of a second summary used to populate another branch node in the first tier of the hierarchical data structure, to generate second tier output. The second summary may describe content used to populate a second subtree of leaf nodes of the hierarchical data structure. For example, the second summary may describe content of leaf nodes of a different subtree than the first subtree, and the additional branch node may be a parent node to the leaf nodes of this additional, disparate subtree. In various implementations, the second tier output generated by hierarchy engine 104 based on this data may include a third summary of the first and second summaries. At block 512, the system, e.g., by way of hierarchy engine 104, may populate a third branch node of a second tier of the hierarchical data structure with the third summary of the first and second summaries.

Revisiting the engine rebuilding example described previously, suppose the first subtree of leaf nodes each includes content of a different digital content item related to engine removal. For example, suppose each digital content item (e.g., text, text plus image(s), video, etc.) pertains to a different vehicle model. Assume further that the second subtree of leaf nodes each includes content of a different digital content item related to engine disassembly (e.g., each digital content item pertaining to a different vehicle model). A first branch node that is populated with a summary of the first subtree may include a general description of engine removal, including aspects derived from the responsive digital content items that are common to removing any type of engine, regardless of vehicle model. A second branch node that is populated with a summary of the second subtree may include a general description of engine disassembly, including aspects of engine disassembly, derived from responsive digital content items, that are common to any type of engine, regardless of vehicle model.

Referring back to FIG. 5, at block 514, the system, e.g., by way of UX engine 108, may provide SRI 134 with data representing hierarchical data structure 114/214. As noted previously, data representing hierarchical data structure 114/214 may take various forms, such as a structured textual document formatted in HTML, XML, JSON, DOT, GML, etc. In various implementations, the data representing hierarchical data structure 114/214 may be operable by SRI 134 to facilitate navigation of hierarchical data structure 114/214 at client device 132. For example, the data representing hierarchical data structure 114/214 may include client-side scripting, such as JavaScript. In some implementations, the operations of block 514 may include, at block 514A, assembling a markup language document, and at block 514B, transmitting that markup language document to the computing device (e.g., 132) that implements SRI 134.

Referring now to FIG. 6, an example method 600 of practicing selected aspects of the present disclosure is described. For convenience, the operations of the flowchart are described with reference to a system that performs the operations. This system may include various components of various computer systems, such as SRI 134 of client device 132 in FIG. 1. Moreover, while operations of method 600 are shown in a particular order, this is not meant to be limiting. One or more operations may be reordered, omitted or added. The example method(s) 600 described in relation to FIG. 6 can enable a SRU to navigate digital content items through an interface. The example method(s) 600 can allow a SRU to interactively search and retrieve stored digital content (e.g., images, videos, audio, text, etc.) more efficiently.

At block 602, the system, e.g., by way of SRI 134, may access a hierarchical data structure that includes at least one branch node and a plurality of leaf nodes that are descendants of the at least one branch node. Each leaf node may contain (e.g., in a corresponding region in memory) respective content extracted or otherwise derived from one or more digital content items that are responsive to a search query issued by a user. As noted previously, this content may have been segmented by segmentation engine 102 from digital content items that were responsive to a search query of user 130.

At block 604, based on the hierarchical data structure, the system, e.g., by way of SRI 134, may provide a screen reader interface that is operable via input received at one or more input devices (e.g., mouse, keyboard, touchscreen, voice input, gaze input, etc.) to navigate the hierarchical data structure (e.g., 114, 214) and render output at one or more speakers (e.g., 136).

In various implementations, content indicative of the hierarchical data structure may additionally or alternatively be rendered visually on a display such as touchscreen 233. For example, at block 606A, in some implementations, the system may render, e.g., on touchscreen 233, a high-contrast visualization of the hierarchical data structure that is navigable using the touchscreen. Additionally or alternatively, at block 606B, the system may render, e.g., on touchscreen 233 overlaid with tactile segmentation template 360 that defines a plurality of windows over touchscreen 233, a visualization of the hierarchical data structure. In this visualization, logical sections of the hierarchical data structure may be rendered within selected windows defined by the tactile segmentation template, e.g., that a user is able to navigate hierarchical data structure using touch. Additionally or alternatively, at block 606C, the system may render, on touchscreen 233 or another display, an interactive visualization of the hierarchical data structure. This interactive visualization may include, for instance, one or more rendered boundaries that separate logical sections of the hierarchical data structure. As described previously, interaction with one or more of the boundaries—e.g., by dragging a finger or stylus closer to and/or on top of a boundary—may trigger rendition of audio or haptic feedback.

At block 608, the system, e.g., by way of SRI 134, may detect one or more inputs that navigate the screen reader interface to the at least one branch node of the hierarchical data structure. In response to the detection of block 608, at block 610, SRI 134 may cause one or more speakers 136 to audibly render a cross-node summary of the contents of the plurality of leaf nodes. In various implementations, the cross-node summary may be generated by summary engine 138 processing the contents of the leaf nodes using LGM 139, although in other implementations these updated summaries may alternatively be generated at screen reader system 100.

At various points while operating SRI 134 to navigate hierarchical data structure 114/214, user 130 may be able to perform various different actions. For example, if a request for a current location (e.g., issued via voice or via a predefined keystroke) is detected, then at block 614, SRI 134 may cause a current location within hierarchical data structure 114/214 to be rendered, e.g., at speaker 136.

As another example, if a request (e.g., voice input, particular keystroke) to create a bookmark is detected at block 616, SRI 134 may store an association between a location (e.g., the current location in hierarchical data structure 114/214 or a designated location) and the bookmark in memory. Subsequently, user 130 can navigate to that same location using one or more inputs associated with the bookmark, such as a voice command that includes a title or other metadata associated with the bookmark, a particular keystroke (e.g., at any given moment, the number keys 0-9 may be set to particular bookmarks), and so forth.

As yet another example, if a request for application of a filter is detected at block 620, then at block 621, SRI 134 may deactivate one or more nodes that relate to the filtered content. At block 624, SRI 134 and/or summary engine 138 may generate a new summary of parent nodes to those that have been filtered. For example, in implementations in which tags (e.g., extracted topics or keywords) are assigned to nodes (e.g., leaf or branch), filters can be applied to exclude any nodes (and their corresponding contents) that that have been assigned the filtered tags.

Figure 7:
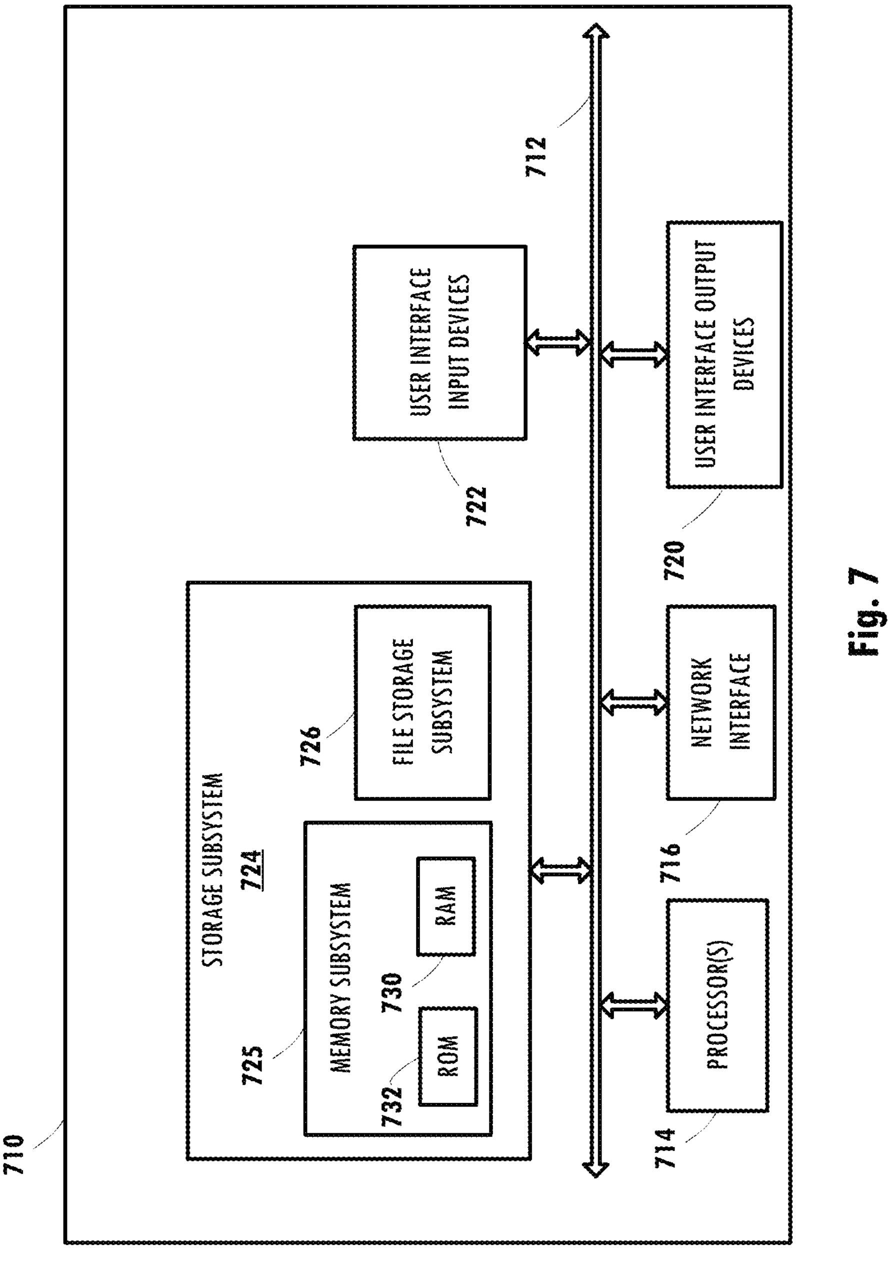
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of methods 500-600, and/or to implement one or more aspects of the various components depicted in FIG. 1. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple buses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In various implementations, a method may be implemented using one or more processors and may include: populating a first subtree of leaf nodes of a hierarchical data structure with content extracted or otherwise derived from one or more digital content items (which may or may not be retrieved and/or be responsive to a search query); using one or more generative models, processing data indicative of the content used to populate the first subtree of leaf nodes to generate first tier output, wherein the first tier output includes a first summary of the content used to populate the first subtree of leaf nodes; populating a first branch node of a first tier of the hierarchical data structure above the subtree of leaf nodes with the first summary of the content used to populate the first subtree of leaf nodes; using one or more of the generative models, processing data indicative of the first summary, in conjunction with data indicative of a second summary used to populate another branch node of the first tier, to generate second tier output, wherein the second tier output includes a third summary of the first and second summaries, and wherein the second summary describes content used to populate a second subtree of leaf nodes of the hierarchical data structure; populating a third branch node of a second tier of the hierarchical data structure with the third summary of the first and second summaries; and providing a screen reader interface with data representing the hierarchical data structure, wherein the data representing the hierarchical data structure is operable by the screen reader interface to facilitate navigation of the hierarchical data structure.

In various implementations, the method may include populating the first branch node with selectable indications of content used to populate leaf nodes of the first subtree. In various implementations, the method may include assigning, to respective leaf nodes of the first subtree, a plurality of tags derived from the content used to populate the first subtree of nodes. In various implementations, the plurality of tags may be contained in the first tier output. In various implementations, the one or more digital content items may include a plurality of digital content items, and the method may further include: determining that one or more of the tags has been selected; assembling an input prompt, wherein the input prompt includes content extracted or otherwise derived from a subset of digital content items of the plurality of digital content items, wherein the subset of digital content items are assigned tags of the plurality of tags that have been selected, and wherein the input prompt excludes content of other digital content items of the plurality of digital content items outside of the subset; and processing the input prompt using one or more of the generative models to generate a fourth summary of the content extracted or otherwise derived from the subset of digital content items of the plurality of digital content items.

In various implementations, the content used to populate the second subtree of leaf nodes of the hierarchical data structure may be extracted or derived from one or more of the digital content items. In various implementations, the method may include: assembling, as a first tier input prompt: data indicative of one or more of the digital content items, and a request to group content of the one or more digital content items into two or more clusters; and processing the first tier input prompt using one or more of the generative models to generate the first tier output. In various implementations, the first subtree of leaf nodes may be populated with content extracted or otherwise derived from content of a first cluster of the two or more clusters, and the second subtree of leaf nodes may be populated with content extracted or otherwise derived from content of a second cluster of the two or more clusters. In various implementations, the request may include a specification of how many clusters are to be created. In various implementations, the specification may be generated automatically based on a length or measure of complexity of the content of one or more of the digital content items.

In various implementations, the screen reader interface may be navigated using directional controls. In various implementations, the directional controls may include arrow keys.

In various implementations, the data representing the hierarchical data structure may include a markup language document that represents the hierarchical data structure, and the method may include: assembling the markup language document; and transmitting the markup language document to a computing device that implements the screen reader interface. In various implementations, the markup language document may include client-side scripting language that is executable on the computing device that implements the screen reader interface to navigate the hierarchical data structure.

In various implementations, populating the first subtree of leaf nodes may include segmenting information from a single document of the one or more digital content items into multiple different leaf nodes. In various implementations, the data representing the hierarchical data structure may be operable to render, on a touchscreen, a high-contrast visualization of the hierarchical data structure that is navigable using the touchscreen.

In various implementations, the data representing the hierarchical data structure may be operable to render, on a touchscreen overlaid with a tactile segmentation template that defines a plurality of windows over the touchscreen, a visualization of the hierarchical data structure in which logical sections of the hierarchical data structure are rendered within selected windows defined by the tactile segmentation template.

In various implementations, the data representing the hierarchical data structure may be operable to render, on a display, an interactive visualization of the hierarchical data structure that includes one or more boundaries that separate logical sections of the hierarchical data structure, wherein interaction with one or more of the boundaries triggers rendition of audio or haptic feedback.

In various implementations, the content extracted or otherwise derived from one or more of the digital content items may include: one or more digital images; digital video content; or digital audio content. In various implementations, the content extracted or otherwise derived from one or more of the digital content items may include textual content.

In another aspect, a method may be implemented using one or more processors and may include: accessing a hierarchical data structure comprising at least one branch node and a plurality of leaf nodes that are descendants of the at least one branch node; based on the hierarchical data structure, providing a screen reader interface that is operable via input received at one or more input devices to navigate the hierarchical data structure and render output at one or more speakers; detecting one or more inputs that navigate the screen reader interface to the at least one branch node of the hierarchical data structure; and in response to the detecting, causing a cross-node summary of the contents of the plurality of leaf nodes to be rendered using one or more speakers, wherein the cross-node summary is generated by processing the contents of the leaf nodes using one or more generative models.

In various implementations, the plurality of leaf nodes may include a first subtree of leaf nodes, the at least one branch node comprises a first branch node and a second branch node, and the hierarchical data structure may further include a second subtree of leaf nodes that are descendants of the second branch node. In various implementations, the method may further include detecting that the screen reader interface has been navigated to the second branch node of the hierarchical data structure; and in response to detecting that the screen reader interface has been navigated to the second branch node, causing a second cross-node summary of contents of the second subtree of leaf nodes to be rendered using one or more of the speakers, wherein the second cross-node summary is generated by processing the contents of the second subtree leaf nodes using one or more of the generative models.

In various implementations, the hierarchical data structure may further include at least one root node that includes the first and second branch nodes as direct or indirect descendants, and the method may further include: detecting that the screen reader interface has been navigated to the root node of the hierarchical data structure; and in response to detecting that the screen reader interface has been navigated to the root node, causing a third cross-node summary to be rendered using one or more of the speakers, wherein the third cross-node summary is generated by processing the first and second cross-node summaries using one or more of the generative models.

In various implementations, the method may include: detecting a request for a current location in the hierarchical data structure; and causing data indicative of the current location to be rendered using one or more of the speakers. In various implementations, the method may include: detecting a request for a bookmark of a location in the hierarchical data structure; and storing, in memory, an association between the location and the bookmark, wherein the bookmark is operable subsequently to navigate the screen reader interface directly to the location associated with the bookmark.

In various implementations, the hierarchical data structure may be represented as a markup language document, and accessing the hierarchical data structure may include loading the markup language document into a screen reader application that provides the screen reader interface. In various implementations, the markup language document may include client-side scripting language that is executable locally to navigate the hierarchical data structure.

In various implementations, the method may include rendering, on a touchscreen, a high-contrast visualization of the hierarchical data structure that is navigable using the touchscreen. In various implementations, the method may include rendering, on a touchscreen overlaid with a tactile segmentation template that defines a plurality of windows over the touchscreen, a visualization of the hierarchical data structure in which logical sections of the hierarchical data structure are rendered within selected windows defined by the tactile segmentation template.

In various implementations, the method may include rendering, on a display, an interactive visualization of the hierarchical data structure that includes one or more boundaries that separate logical sections of the hierarchical data structure, wherein interaction with one or more of the boundaries triggers rendition of audio or haptic feedback. In various implementations, each leaf node may contain respective content extracted or otherwise derived from one or more digital content items that are responsive to a search query.

Other implementations may include a transitory or non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for facilitating non-linear consumption of digital content using a screen reader interface, the method implemented using one or more processors and comprising:

populating a first subtree of leaf nodes of a hierarchical data structure with content extracted or otherwise derived from one or more digital content items;

using one or more generative models, processing data indicative of the content used to populate the first subtree of leaf nodes to generate first tier output, wherein the first tier output includes a first summary of the content used to populate the first subtree of leaf nodes;

populating a first branch node of a first tier of the hierarchical data structure above the first subtree of leaf nodes with the first summary of the content used to populate the first subtree of leaf nodes;

using one or more of the generative models, processing data indicative of the first summary, in conjunction with data indicative of a second summary used to populate another branch node of the first tier, to generate second tier output, wherein the second summary describes content used to populate a second subtree of leaf nodes of the hierarchical data structure that is disparate from the first subtree, and wherein the second tier output includes a third summary that summarizes both of the first and second summaries;

populating a third branch node of a second tier of the hierarchical data structure with the third summary of the first and second summaries; and providing the screen reader interface with data representing the hierarchical data structure, wherein the data representing the hierarchical data structure is operable by the screen reader interface to audibly render the third summary and to render a selectable indication that is operable to trigger traversal to the first branch node to trigger audible rendition of the first summary.

2. The method of claim 1, further comprising retrieving the one or more digital content items, wherein the one or more digital content items are responsive to a search query.

3. The method of claim 1, further comprising populating the first branch node with selectable indications of content used to populate leaf nodes of the first subtree.

4. The method of claim 1, further comprising assigning, to respective leaf nodes of the first subtree, a plurality of tags derived from the content used to populate the first subtree of nodes.

5. The method of claim 4, wherein the plurality of tags are contained in the first tier output.

6. The method of claim 4, wherein the one or more digital content items comprise a plurality of digital content items, and the method further comprises:

determining that one or more of the plurality of tags has been selected;

assembling an input prompt, wherein the input prompt includes content extracted or otherwise derived from a subset of digital content items of the plurality of digital content items, wherein the subset of digital content items are assigned tags of the plurality of tags that have been selected, and wherein the input prompt excludes content of other digital content items of the plurality of digital content items outside of the subset of digital content; and processing the input prompt using one or more of the generative models to generate a fourth summary of the content extracted or otherwise derived from the subset of digital content items of the plurality of digital content items.

7. The method of claim 1, wherein the content used to populate the second subtree of leaf nodes of the hierarchical data structure is extracted or derived from one or more of the digital content items.

8. The method of claim 1, further comprising:

assembling, as a first tier input prompt:

data indicative of one or more of the digital content items, and a request to group content of the one or more digital content items into two or more clusters; and processing the first tier input prompt using one or more of the generative models to generate the first tier output.

9. The method of claim 8, wherein the first subtree of leaf nodes is populated with content extracted or otherwise derived from content of a first cluster of the two or more clusters, and the second subtree of leaf nodes is populated with content extracted or otherwise derived from content of a second cluster of the two or more clusters.

10. The method of claim 8, wherein the request includes a specification of how many clusters are to be created.

11. The method of claim 10, wherein the specification is generated automatically based on a length or measure of complexity of the content of one or more of the digital content items.

12. The method of claim 1, wherein the data representing the hierarchical data structure comprises a markup language document that represents the hierarchical data structure, and the method further comprises:

assembling the markup language document; and transmitting the markup language document to a computing device that implements the screen reader interface;

wherein the markup language document includes client-side scripting language that is executable on the computing device that implements the screen reader interface to navigate the hierarchical data structure.

13. The method of claim 1, wherein populating the first subtree of leaf nodes comprises segmenting information from a single document of the one or more digital content items into multiple different leaf nodes.

14. The method of claim 1, wherein the data representing the hierarchical data structure is operable to render, on a touchscreen, a high-contrast visualization of the hierarchical data structure that is navigable using the touchscreen.

15. The method of claim 1, wherein the data representing the hierarchical data structure is operable to render, on a touchscreen overlaid with a tactile segmentation template that defines a plurality of windows over the touchscreen, a visualization of the hierarchical data structure in which logical sections of the hierarchical data structure are rendered within selected windows defined by the tactile segmentation template.

16. The method of claim 1, wherein the data representing the hierarchical data structure is operable to render, on a display, an interactive visualization of the hierarchical data structure that includes one or more boundaries that separate logical sections of the hierarchical data structure, wherein interaction with one or more of the boundaries triggers rendition of audio or haptic feedback.

17. The method of claim 1, wherein the content extracted or otherwise derived from one or more of the digital content items comprises:

one or more digital images;

digital video content; or digital audio content.

18. A system for facilitating non-linear consumption of digital content using a screen reader interface, the system comprising one or more processors and memory storing instructions that, in response to execution by the one or more processors, cause the one or more processors to:

populate a first subtree of leaf nodes of a hierarchical data structure with content extracted or otherwise derived from one or more digital content items;

use one or more generative models to process data indicative of the content used to populate the first subtree of leaf nodes to generate first tier output, wherein the first tier output includes a first summary of the content used to populate the first subtree of leaf nodes;

populate a first branch node of a first tier of the hierarchical data structure above the first subtree of leaf nodes with the first summary of the content used to populate the first subtree of leaf nodes;

use one or more of the generative models to process data indicative of the first summary, in conjunction with data indicative of a second summary used to populate another branch node of the first tier, to generate second tier output, wherein the second summary describes content used to populate a second subtree of leaf nodes of the hierarchical data structure that is disparate from the first subtree, and wherein the second tier output includes a third summary that summarizes both of the first and second summaries;

populate a third branch node of a second tier of the hierarchical data structure with the third summary of the first and second summaries; and provide the screen reader interface with data representing the hierarchical data structure, wherein the data representing the hierarchical data structure is operable by the screen reader interface to audibly render the third summary and to render a selectable indication that is operable to trigger traversal to the first branch node to trigger audible rendition of the first summary.

19. The system of claim 18, further comprising retrieving the one or more digital content items, wherein the one or more digital content items are responsive to a search query.

20. At least one non-transitory computer-readable medium for facilitating non-linear consumption of digital content using a screen reader interface, the at least one non-transitory computer-readable medium comprising instructions that, in response to execution of the instructions by one or more processors, cause the one or more processors to perform the following operations:

populating a first subtree of leaf nodes of a hierarchical data structure with content extracted or otherwise derived from one or more digital content items;

using one or more generative models, processing data indicative of the content used to populate the first subtree of leaf nodes to generate first tier output, wherein the first tier output includes a first summary of the content used to populate the first subtree of leaf nodes;

populating a first branch node of a first tier of the hierarchical data structure above the first subtree of leaf nodes with the first summary of the content used to populate the first subtree of leaf nodes;

using one or more of the generative models, processing data indicative of the first summary, in conjunction with data indicative of a second summary used to populate another branch node of the first tier, to generate second tier output, wherein the second summary describes content used to populate a second subtree of leaf nodes of the hierarchical data structure that is disparate from the first subtree, and wherein the second tier output includes a third summary that summarizes both of the first and second summaries;

populating a third branch node of a second tier of the hierarchical data structure with the third summary of the first and second summaries; and providing the screen reader interface with data representing the hierarchical data structure, wherein the data representing the hierarchical data structure is operable by the screen reader interface to audibly render the third summary and to render a selectable indication that is operable to trigger traversal to the first branch node to trigger audible rendition of the first summary.

* * * * *